(12) United States Patent
Bischel et al.

(10) Patent No.: US 10,745,920 B2
(45) Date of Patent: Aug. 18, 2020

(54) FIRE PERFORMANCE FOR WOOD VENEER LAMINATED CEILING TILE

(71) Applicant: ARMSTRONG WORLD INDUSTRIES, INC., Lancaster, PA (US)

(72) Inventors: Marsha S. Bischel, Lancaster, PA (US); Kenneth P. Kehrer, Lancaster, PA (US); Lida Lu, Coraopolis, PA (US); Michelle X. Wang, Lititz, PA (US)

(73) Assignee: AWI Licensing LLC, Wilmington, DE (US)

( * ) Notice: Subject to any disclaimer, the term of this patent is extended or adjusted under 35 U.S.C. 154(b) by 157 days.

(21) Appl. No.: 15/334,923

(22) Filed: Oct. 26, 2016

(65) Prior Publication Data

US 2017/0121982 A1 May 4, 2017

Related U.S. Application Data

(60) Provisional application No. 62/247,569, filed on Oct. 28, 2015.

(51) Int. Cl.
*E04F 13/077* (2006.01)
*E04B 9/22* (2006.01)
(Continued)

(52) U.S. Cl.
CPC .............. *E04F 13/077* (2013.01); *B32B 7/12* (2013.01); *B32B 9/005* (2013.01); *B32B 9/042* (2013.01);
(Continued)

(58) Field of Classification Search
CPC ........ E04F 13/077; B32B 21/04; B32B 21/14; B32B 15/18; B32B 7/12; E04B 9/34
See application file for complete search history.

(56) References Cited

U.S. PATENT DOCUMENTS 3,090,764 A   5/1963   Ellis et al.
3,220,915 A   11/1965  Shannon
(Continued)

FOREIGN PATENT DOCUMENTS

CN   1599772 A    3/2005
CN   101666153 A  3/2010
(Continued)

OTHER PUBLICATIONS

Epoxy Technology, Tech tip 23, 2012. (Year: 2012).*
(Continued)

*Primary Examiner* — Hai Vo
(74) *Attorney, Agent, or Firm* — Craig M. Sterner (57) ABSTRACT

The present invention is directed to a building panel having a laminate structure, the laminate structure including a topcoat layer comprising a first intumescent composition, a cellulosic veneer layer, an adhesive layer formed from an adhesive composition comprising a second intumescent composition, and a metallic substrate layer and wherein the cellulosic veneer layer is at least partially bonded to the metallic substrate by the adhesive layer. The resulting building panel exhibits superior flame retardancy resulting in a Class A fire rating, according to ASTM E-84.

8 Claims, 5 Drawing Sheets

(51) Int. Cl.

| | | |
|---|---|---|
| *E04B 9/34* | (2006.01) | |
| *B32B 21/14* | (2006.01) | |
| *B32B 9/04* | (2006.01) | |
| *B32B 9/00* | (2006.01) | |
| *B32B 21/04* | (2006.01) | |
| *B32B 21/02* | (2006.01) | |
| *B32B 15/18* | (2006.01) | |
| *B32B 7/12* | (2006.01) | |
| *B32B 15/10* | (2006.01) | |
| *B32B 15/20* | (2006.01) | |
| *E04B 9/04* | (2006.01) | |
| *E04F 13/12* | (2006.01) | |
| *B32B 37/12* | (2006.01) | |
| *E04F 13/08* | (2006.01) | |

(52) U.S. Cl.
CPC .............. *B32B 15/10* (2013.01); *B32B 15/18* (2013.01); *B32B 15/20* (2013.01); *B32B 21/02* (2013.01); *B32B 21/04* (2013.01); *B32B 21/14* (2013.01); *E04B 9/045* (2013.01); *E04B 9/225* (2013.01); *E04B 9/34* (2013.01); *E04F 13/12* (2013.01); *B32B 37/1207* (2013.01); *B32B 2037/1215* (2013.01); *B32B 2250/02* (2013.01); *B32B 2255/08* (2013.01); *B32B 2255/26* (2013.01); *B32B 2255/28* (2013.01); *B32B 2307/304* (2013.01); *B32B 2307/3065* (2013.01); *B32B 2307/412* (2013.01); *B32B 2307/50* (2013.01); *B32B 2307/73* (2013.01); *B32B 2307/732* (2013.01); *B32B 2311/24* (2013.01); *B32B 2419/00* (2013.01); *B32B 2607/00* (2013.01); *E04F 13/0866* (2013.01)

(56) References Cited

U.S. PATENT DOCUMENTS

| | | | | |
|---|---|---|---|---|
| 3,538,055 | A | * | 11/1970 | Camilleri ............. C08G 18/664 428/424.6 |
| 3,870,594 | A | * | 3/1975 | Kudo ........................ B44F 9/02 428/220 |
| 3,934,066 | A | | 1/1976 | Murch |
| 3,955,987 | A | * | 5/1976 | Schaar ................... C09D 5/185 106/18.15 |
| 3,960,639 | A | | 6/1976 | Kudo |
| 4,058,643 | A | | 11/1977 | Marshall et al. |
| 5,698,061 | A | * | 12/1997 | Maag ..................... B32B 21/14 156/244.27 |
| 5,759,692 | A | * | 6/1998 | Scholz ............... C08G 59/4071 428/413 |
| 5,925,457 | A | | 7/1999 | McGinniss et al. |
| 5,962,603 | A | | 10/1999 | Qureshi et al. |
| 7,824,583 | B2 | | 11/2010 | Gang |
| 8,397,864 | B2 | | 3/2013 | Tinianov et al. |
| 9,085,894 | B2 | | 7/2015 | Eckman et al. |
| 2005/0029499 | A1 | | 2/2005 | Kasowski et al. |
| 2006/0205909 | A1 | * | 9/2006 | O'Brien .................. C08G 18/12 528/44 |
| 2007/0197686 | A1 | * | 8/2007 | Dimanshteyn ........... C09D 5/18 523/179 |
| 2011/0245449 | A1 | * | 10/2011 | Boudou ............. C08G 18/0895 528/58 |
| 2011/0268960 | A1 | | 11/2011 | Marin |
| 2012/0160413 | A1 | * | 6/2012 | Laferte .................. C08G 18/10 156/331.7 |
| 2013/0004720 | A1 | * | 1/2013 | Mattellone .............. B32B 15/10 428/157 |
| 2014/0295164 | A1 | | 10/2014 | Parket et al. |
| 2015/0352744 | A1 | * | 12/2015 | Zhang .................... B27K 3/166 428/337 |
| 2016/0089855 | A1 | * | 3/2016 | Gwin ...................... B32B 27/06 428/212 |
| 2016/0311194 | A1 | * | 10/2016 | Brown .................... B32B 5/028 |

FOREIGN PATENT DOCUMENTS

| | | |
|---|---|---|
| CN | 102256806 A | 11/2011 |
| CN | 102272381 A | 12/2011 |
| DE | 29713040 U1 | 11/1997 |
| EP | 0492248 A2 | 7/1992 |
| EP | 0505940 A1 | 9/1992 |
| EP | 0570233 A1 | 11/1993 |
| GB | 2354189 A | 3/2001 |
| RU | 2329898 C2 | 7/2008 |
| RU | 98024 U1 | 9/2010 |
| WO | 8600915 | 2/1986 |
| WO | WO 2010/056372 A1 | 5/2010 |

OTHER PUBLICATIONS

Abstract translation of BE 90394 A, Benoit Beaujean, Jun. 30, 1986.*
European Extended Search Report for related Application No. 16860677.0 dated Mar. 26, 2019.
Chinese Search Report for related CN Application No. 2016800590186 dated Sep. 4, 2019.
English Translation of Russian Search Report of related application RU 2018119122 issued with Office Action dated Apr. 30, 2020.

* cited by examiner

FIRE PERFORMANCE FOR WOOD VENEER LAMINATED CEILING TILE

CROSS-REFERENCE TO RELATED APPLICATIONS

This application claims the benefit of U.S. Provisional Application No. 62/247,569, filed on Oct. 28, 2015. The disclosure of the above application is incorporated herein by reference.

BACKGROUND

Building products for interior room environments balance interests with respect to cosmetic value, material cost, structural integrity, and fire safety. Previously, maximizing one or two of the aforementioned interests required sacrificing the remaining interests. For example, a building panel that uses natural materials (e.g., natural grain from real wood, as compared to replica grain from printed wood texture) may have superior cosmetic value. However, such building panels also previously had associated safety concerns as either the entire building panel would be made from wood, thereby increasing flammability concerns, or a cosmetic laminate structure could be used, in which case the veneer layer is susceptible to delamination at high heat, causing the veneer layer to fall from the building panel, thereby endangering individuals below the building and/or further fueling a fire.

Regarding laminate structures, previous attempts have been made to improve the fire safety performance of these building panels. Improved fire safety performance can be qualified as either: Class A, B, or C rating—with Class A being the best and C being the worst. However, some previous attempts to achieve superior fire safety have involved supporting the building panels during fire testing by use of a variety of external means—such as rods, bars and/or chicken wire. Adding such external support is not only inconsistent with the requirements of the building code or the current ASTM E84 standard, but it also provides a false indication of the integrity of the building panel during fire testing. Stated simply, there is a need for building panels that exhibit superior cosmetic value while also exhibiting high lamination integrity, especially during a fire in order to ensure proper fire safety.

BRIEF SUMMARY

According to embodiments, the present invention is directed to a ceiling panel comprising a laminate structure, the laminate structure comprising a topcoat layer comprising an intumescent composition; a cellulosic veneer layer comprising a first major surface opposite a second major surface; an adhesive layer formed from an adhesive composition comprising a thermoplastic polymer; and a metallic substrate layer; wherein the cellulosic veneer layer is at least partially bonded to the metallic substrate by the adhesive layer.

In other embodiments, the present invention is directed to a ceiling panel comprising a laminate structure, the laminate structure comprising a topcoat layer comprising a sealant composition; and an intumescent composition; a cellulosic veneer layer having a first major surface opposite a second major surface; an adhesive layer formed from an adhesive composition comprising a thermoplastic polymer; and a metallic substrate layer; wherein the first sub-layer is atop the first major surface of the cellulosic veneer layer; and the second sub-layer is atop the first sub-layer.

In other embodiments, the present invention is directed to a building panel comprising a laminate structure, the laminate structure comprising a cellulosic layer; and a topcoat layer that is substantially impervious to ambient moisture and comprising an intumescent composition.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" means less than about 0.1 wt. % based on the total of the referenced value.

Figure 1:
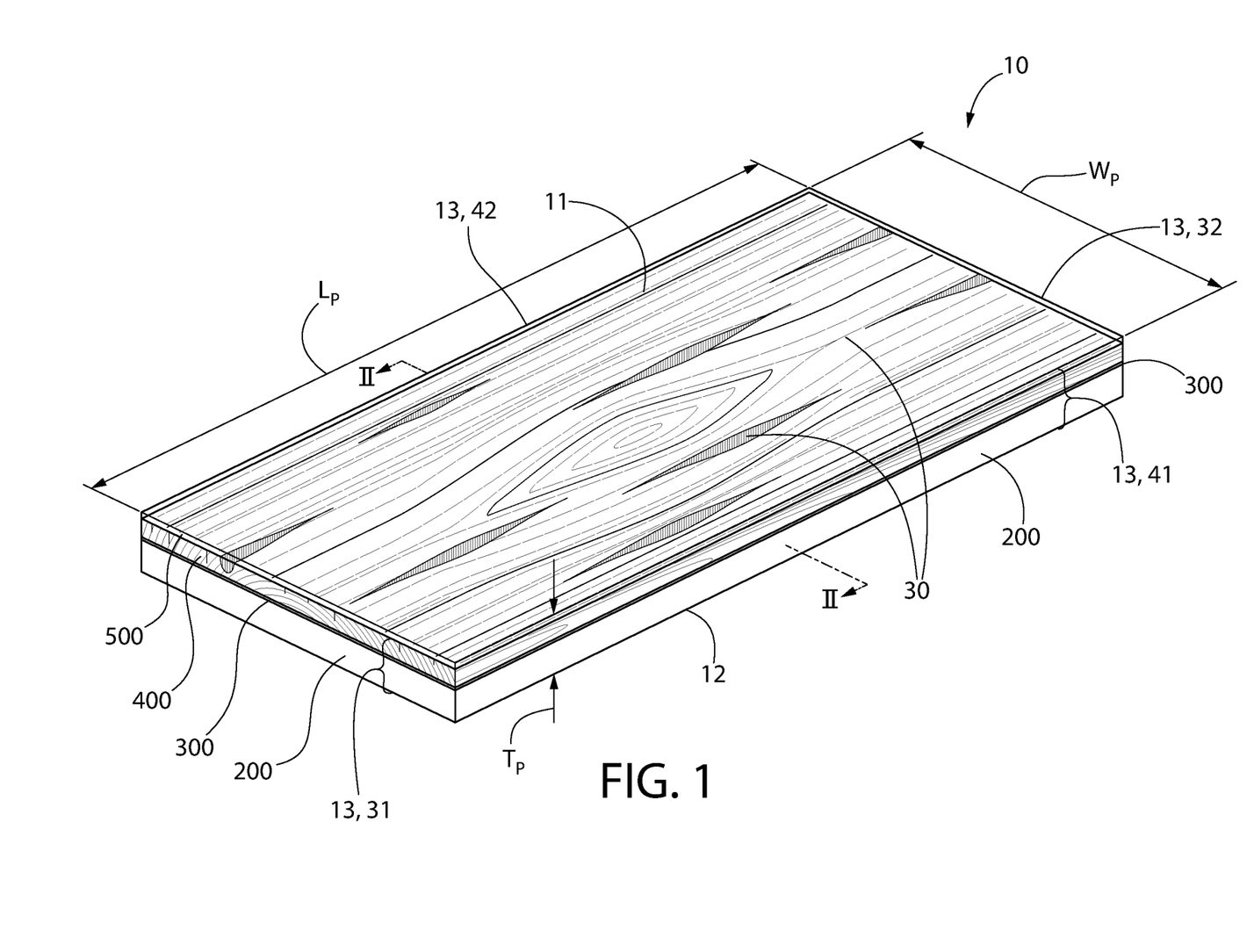
FIG. 1 is top perspective view of the building panel according to the present invention.
Figure 5:
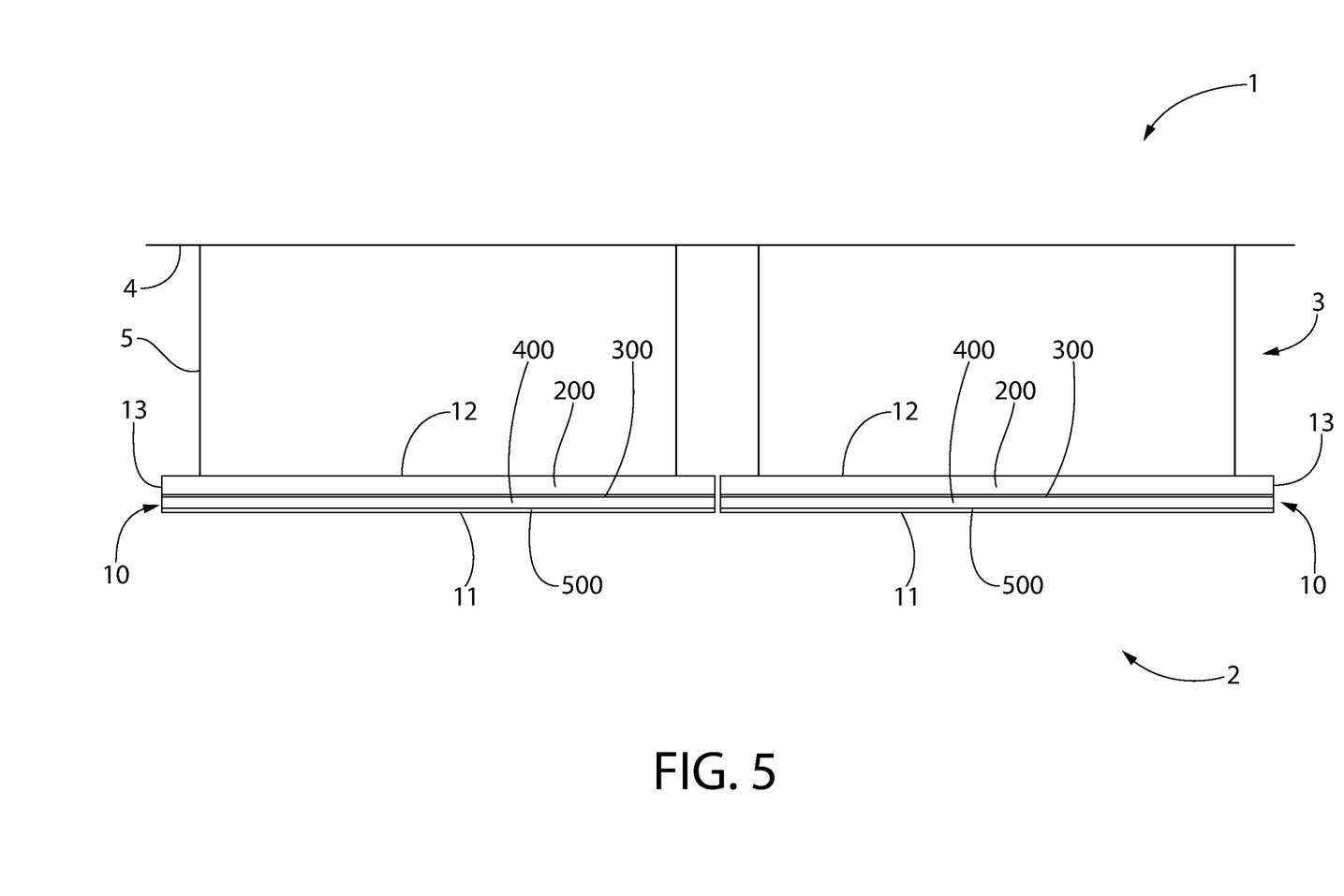
FIG. 5 is a ceiling system comprising the building panel of the present invention.

Referring to FIGS. 1 and 5, the present invention includes a ceiling system 1 as well as a building panel 10 that may be used in the ceiling system 1. The ceiling system 1 may comprise at least one or more of the building panels 10 installed in an interior space, whereby the interior space comprises a plenum space 3 and an active room environment 2. The plenum space 3 is defined by the space occupied between a structural barrier 4 between floors of a building and the lower major surface 12 of the building panel 10. The plenum space 3 provides space for mechanical lines within a building (e.g., HVAC, electrical lines, plumbing, telecommunications, etc.). The active space 2 is defined by the space occupied beneath the upper major surface 11 of the building panel 10 for one floor in the building. The active space 2 provides room for the building occupants during normal intended use of the building (e.g., in an office building, the active space would be occupied by offices containing computers, lamps, etc.).

Each of the building panels 10 may be supported in the interior space by one or more supports 5. Each of the building panels 10 are installed such that the upper major surface 11 of the building panel 10 faces the active room environment 2 and the lower major surface 12 of the building panel 10 faces the plenum space 3. The building panels 10 of the present invention have superior fire safety performance—particularly when a fire originates in the active room environment 2—without sacrificing the desired aesthetic appearance of the building panel 10, as discussed herein.

Referring to FIG. 1, the present invention is a building panel 10 comprising a laminate structure having multiple layers. The building panel 10 may comprise an upper major surface 11, a lower major surface 12 that is opposite the upper major surface 11, and major side surfaces 13 that extend from the upper major surface 11 to the lower major surface 12 to form a perimeter of the building panel 10. The major side surfaces 13 may comprise first and second longitudinal side surfaces 41, 42 extending substantially parallel to each other. The major side surfaces 13 may further comprise first and second transverse side surfaces 31, 32 extending substantially parallel to each other. The first and second longitudinal side surfaces 41, 42 may extend substantially orthogonal to the first and second transverse side surfaces 31, 32.

The building panel 10 may have a panel thickness "$t_P$" as measured from the upper major surface 11 to the lower major surface 12. The panel thickness $t_P$ may range from about 25 mils to about 250 mils—including all values and sub-ranges there-between. The building panel 10 may have a panel length "$L_P$" as measured from the first transverse side surface 31 to the second transverse side surface 32—i.e., the distance along one of the first or second longitudinal side surfaces 41, 42. The panel length $L_P$ may range from about 10 inches to about 120 inches—including all values and sub-ranges there-between. The building panel 10 may have a panel width "$W_P$" as measured from the first longitudinal side surface 41 to the second longitudinal side surface 42—i.e., the distance along one of the first or second transverse side surfaces 31, 32. The panel width $W_P$ may range from about 12 inches to about 60 inches—including all values and sub-ranges there-between. The building panel 10 comprises a decorative pattern 30 that is visible from the upper major surface 11. The decorative pattern 30 may comprise a pattern formed from natural materials, such as cellulosic materials (e.g., wood grain, knots, burl, etc.).

The laminate structure of the building panel 10 may comprise a substrate layer 200, an adhesive layer 300, a cellulosic layer 400, and a topcoat layer 500. Specifically, the topcoat layer 500 is atop the cellulosic layer 400, the cellulosic layer 400 is atop the adhesive layer 300, and the adhesive layer is atop the substrate 200 layer—as discussed further herein. The cellulosic layer 400 may be adhesively bonded to the substrate layer 200 by the adhesive layer 300, as discussed further herein. The combination of layers 200, 300, 400, 500 of the present invention creates a laminate structure having high lamination integrity in a ceiling system under both standard conditions (i.e. daily operation of an interior building environment) but also during exposure to the extreme heat and temperature that may result from a fire. Thus, the laminate structure of the present invention results in a robust building panel 10 that meets at least Class B fire rating, preferably Class A fire rating. For the purposes of the present invention, "high lamination integrity" means each layer 200, 300, 400, 500 of the laminate structure remains coupled and/or bonded to the adjacent layer 200, 300, 400, 500 without the aid of external supports (e.g., rods, bars, chicken wire, and the like) applied to one or more of the major surfaces of the laminate structure. Stated otherwise, the internal bond of each layer and/or coupling between each layer 200, 300, 400, 500 is sufficient such that each layer 200, 300, 400, 500 does not internally degrade or delaminate from an adjacent layer 200, 300, 400, 500 to an extent that causes the laminate structure to break apart.

Figure 2:
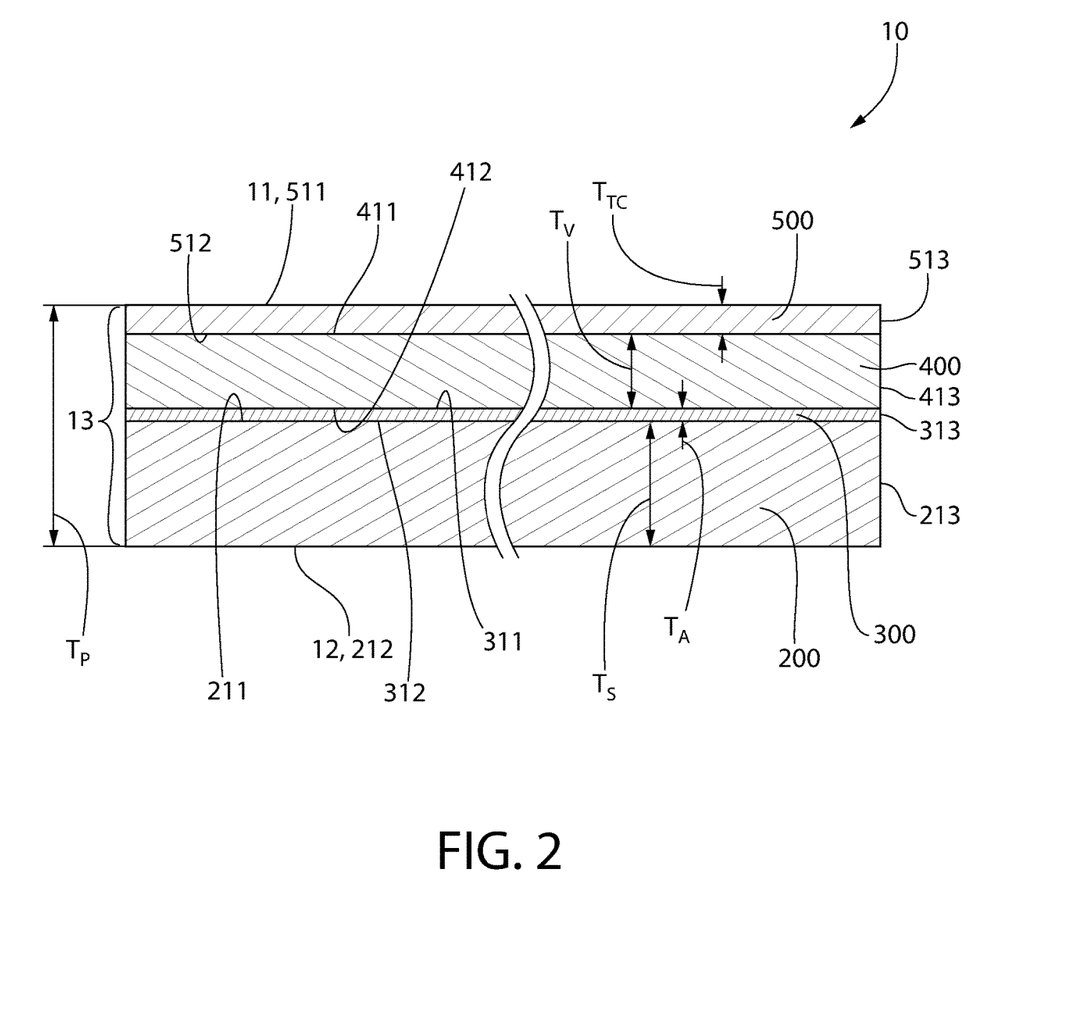
FIG. 2 is a cross-sectional view of the building panel according to the present invention, the cross-sectional view being along the II line set forth in FIG. 1.

Referring now to FIG. 2, the substrate layer 200 may comprises an upper substrate surface 211 and a lower substrate surface 212 that is opposite the upper substrate surface 211. The substrate layer 200 may comprise a substrate side surface 213 that extends from the upper substrate surface 211 to the lower substrate surface 212 and forms a perimeter of the substrate layer 200. The substrate side surface 213 may form a portion of the major side surface 13 of the building panel 10. Stated otherwise, the major side surface 13 of the building panel 10 may comprise the substrate side surface 213.

The substrate layer 200 may be formed from a metallic material, ceramic material, or composite material. Non-limiting examples of metallic material include aluminum, steel, and iron. In a preferred embodiment, the substrate layer 200 is formed from aluminum. The substrate layer 200 may have a substrate thickness "$t_S$" ranging from about 20 mils to about 100 mils—including all values and sub-ranges there-between. The substrate thickness $t_S$ may range from about 25 mils to about 80 mils. In a preferred embodiment, the substrate thickness $t_S$ ranges from about 30 mils to about 65 mils—including all values and sub-ranges there-between.

The adhesive layer 300 may comprises an upper adhesive surface 311 and a lower adhesive surface 312 opposite the upper adhesive surface 311. The adhesive layer 300 may comprise an adhesive side surface 313 that extends from the upper adhesive surface 311 to the lower adhesive surface 312 and forms a perimeter of the adhesive layer 300. The adhesive side surface 313 may form a portion of the major side surface 13 of the building panel 10. Stated otherwise, the major side surface 13 of the building panel 10 may comprise the adhesive side surface 213. The adhesive layer 300 may have an adhesive thickness "$t_A$" ranging from about 2 mils to about 20 mils—including all values and sub-ranges there-between—as measured from the upper adhesive surface 311 to the lower adhesive surface 312. In a preferred embodiment, the adhesive thickness "$t_A$" ranges from about 5 mils to about 15 mils—including all values and sub-ranges there-between.

The adhesive layer 300 may be formed from an adhesive composition that is a hot-melt composition. According to the purposes of the present invention, the term "hot-melt adhesive composition" means a composition having a melt viscosity ranging from about 10,000 centipoise to about 40,000 centipoise at a temperature of about 135° C.—including all values and sub-ranges there-between. The hot-melt adhesive composition may be solid at room temperature and be substantially free of solvent. The adhesive composition may comprise adhesive polymer in an amount ranging from about 50 wt. % to about 100 wt. % based on the total weight of the adhesive composition—including all values and sub-ranges there-between.

The adhesive polymer according to the present invention may be a thermoplastic polymer. Non-limiting examples of the thermoplastic polymer may include moisture cured polyester modified polyurethane polymers. Such polyester modified polyurethanes may be formed by reacting organic diisocyanate with difunctional polyester polyol and low molecular weight diols (as chain-extending agents) at a non-limiting NCO:OH ratio of about 0.7:1 to about 1.3:1—including all sub-ranges and ratios there-between.

Non-limiting examples of polyester polyol include difunctional polyester diols containing alcoholic hydroxyl groups. Suitable polyester diols are polyester having average molecular weights of from 800 to 5000 and preferably from 2000 to 4000 produced from (i) dicarboxylic acids containing at least 6 carbon atoms, such as adipic acid, pimelic acid, suberic acid, azelaic acid and/or sebacic acid (preferably adipic acid, as the sole acid component) and (ii) alkane diols that may contain at least 4 carbon atoms, such as, for example, 1,4-dihydroxy-butane, 1,5-dihydroxypentane and/or 1,6-dihydroxy-hexane. Polycondensates of ω-hydroxyalkane-mono-carboxylic acids and the polymers of their lactones are also suitable, although less preferred.

Low molecular weight diols suitable as chain-extending agents in accordance with the present invention include, in particular, aliphatic diols having average molecular weight of from 62 to 400 or mixtures thereof. Non-limiting examples of such diols include ethylene glycol, 1,3-dihydroxy-propane, 1,4-dihydroxy-butane, 1,5-dihydroxypentane, 1,6-dihydroxyhexane, and the like.

Non-limiting examples of suitable aromatic polyisocyanates include all isomers of toluylene-diisocyanate (TDI), naphthalene-1,5-diisocyanate, diphenylmethane-4,4'-diisocyanate (MDI), diphenylmethane-2,4'-diisocyanate and mixtures of 4,4'-diphenylmethane-diisocyanate with the 2,4' isomer or mixtures thereof with oligomers of higher functionality (so-called crude MDI), xylylene-diisocyanate (XDI), 4,4'-diphenyl-dimethylmethane-diisocyanate, di- and tetra-alkyl-diphenylmethane-diisocyanate, 4,4'-dibenzyl-diisocyanate, 1,3-phenylene-diisocyanate and 1,4-phenylene-diisocyanate. Examples of suitable cycloaliphatic polyisocyanates are the hydrogenation products of the above-mentioned aromatic diisocyanates, such as 4,4'-dicyclohexylmethane-diisocyanate ($H_{12}$MDI), 1-isocyanatomethyl-3-isocyanato-1,5,5-trimethyl-cyclohexane (isophorone-diisocyanate, HMI), cyclohexane-1,4-diisocyanate, hydrogenated xylylene-diisocyanate ($H_6$XDI), 1-methyl-2,4-diisocyanato-cyclohexane, m- or p-tetramethylxylene-diisocyanate (m-TMXDI, p-TMXDI) and dimer-fatty acid diisocyanate. Examples of aliphatic polyisocyanates are tetramethoxybutane-1,4-diisocyanate, butane-1,4-diisocyanate, hexane-1,6-diisocyanate (HDI), 1,6-diisocyanato-2,2,4-trimethylhexane, 1,6-diisocyanato-2,4,4-trimethylhexane and 1,2-dodecane-diisocyanate ($C_{12}$DI).

The thermoplastic adhesive compositions comprise thermoplastic polymer that may transition from the glassy state to the molten state (or may melt entirely) when heated to an elevated temperature (e.g., when an office building catches on fire). Thus, when thermoplastic polymer is exposed to elevated temperatures, such as in a fire, the adhesive layer may become susceptible to creep, especially when a load is applied to that adhesive layer (e.g., a cellulosic layer adhered to the adhesive layer). With the increased susceptibility to creep, there is a greater likelihood that the adhesive layer will deform and fail at such elevated temperatures. Therefore, laminate structures using adhesive that comprises thermoplastic polymer are at risk of having certain layers (i.e., cellulosic layers) delaminate and separate from the over laminate structure during a fire.

However, the adhesive composition of the present invention overcomes these difficulties by using a moisture cured thermoplastic polymer. Specifically, the moisture-curing produces a high crosslinking density within the polymer network, which increases adhesive bond strength at room temperature. Furthermore, the thermoplastic polymer may have a polyester-modified polymer backbone—with the polyester further enhancing the high temperature performance of the moisture-cured thermoplastic polymer. Stated otherwise, the moisture-cured, polyester-modified polyurethane adhesive of the present invention forms an adhesive layer 300 having high lamination integrity even at elevated temperatures, which translates into a robust building panel 10 having superior structural integrity during a fire. The adhesive polymer of the present invention may exhibit a higher melting and softening temperatures, giving higher adhesive strength to the final building panel 10. With such high-heat properties, the adhesive composition of the present invention increases resistance to delamination of the cellulosic layer 400 from the substrate layer 200 in a fire even without the help of whether external means (e.g. chicken wire, rods, etc.) providing additional structural support to one or both of the upper major surface 11 and the lower major surface 12 of the building panel 1.

The adhesive layer 300 may be formed by heating the adhesive composition to an application temperature ranging from about 120° C. to about 165° C. (including all values and sub-ranges there-between) and applying the heated adhesive composition to at least one of the substrate layer 200 or the cellulosic layer 400, and joining the substrate layer 200 to the cellulosic layer 400, as discussed further herein.

Once the adhesive composition is heated to the application temperature and applied (continuously or discontinuously) to at least one of the substrate layer 200 or the cellulosic layer 400, the adhesive composition may develop significant green strength once a cellulosic layer is applied within about 30 seconds; bond strength continues to develop over time, and in the presence of moisture. The phrase "green strength" refers to a material's ability to resist deformation and/or fracture before the composition has been cured/cross-linked. Developing significant green strength within about 30 seconds after lamination allows for faster coupling of the cellulosic layer 400 to the substrate layer 200 as pressure can be applied to at least one of the substrate layer 200 or the cellulosic layer 400 to ensure proper bonding between the substrate layer 200 and the cellulosic layer 400 by the resulting adhesive layer 300.

Once the adhesive composition is heated to the application temperature and applied to at least one of the substrate layer 200 or the cellulosic layer 400, the adhesive composition may also have an open time up to about 45 seconds. The phrase "open time" refers to a time span in which a composition may be workable, allowing for proper application of that composition before final curing/cross-linking. Having an open time up to about 45 seconds allows sufficient time for the cellulosic layer 400 to be coupled to the substrate layer 200 without undermining the adhesive strength formed by the resulting adhesive layer 300.

The adhesive composition of the present invention may further comprise additives selected from the group consisting of 2,2'-dimorpholinethyl ether catalyst, di(2,6-dimethylmorpholinoethyl)ether catalyst, adhesion promoters, diluents, plasticizers, fillers, antioxidants pigments, UV absorbers and combinations thereof. In other embodiments, the adhesive composition may further comprise a flame retardant. Non-limiting examples of flame retardant may include ammonium hydroxide, magnesium hydroxide, huntite, hydromagnesite, silica, polyphosphate, melamine cyanurate, chloride salts—such as sodium chloride, antimony oxide, and borates, such as calcium borate, magnesium borate, zinc borate, and combinations thereof. The flame retardant may be present in the adhesive composition in an amount ranging from about 0 wt. % to about 50 wt. % based on the total weight of the adhesive composition—including all values and sub-ranged there-between.

Referring to FIG. 2, the cellulosic layer 400 may comprise an upper cellulosic surface 411 and a lower cellulosic surface 412 opposite the upper cellulosic surface 411. The cellulosic layer 400 may comprise a cellulosic side surface 413 that extends from the upper cellulosic surface 411 to the lower cellulosic surface 412 and forms a perimeter of the cellulosic layer 400. The cellulosic side surface 413 may form a portion of the major side surface 13 of the building panel 10. Stated otherwise, the major side surface 13 of the building panel 10 may comprise the cellulosic side surface 413.

In the exemplified embodiments, the cellulosic layer 400 is a cellulosic veneer layer 400 having a cellulosic veneer thickness "$t_v$" ranging from about 5 mils to about 100 mils—including all values and sub-ranges there-between. The cellulosic veneer thickness $t_v$ may range from about 10 mils to about 80 mils—including all values and sub-ranges there-between; alternatively from about 20 mils to about 50 mils—including all values and sub-ranges there-between. According to some embodiments, the cellulosic veneer thickness $t_v$ may range from about 25 mils to about 35 mils.

According to the present invention the term "veneer" means a thin layer formed entirely out of the cellulosic material or that is comprised of thin layers of cellulosic material that have been adhered together, and then cut into continuous sheets. Veneer layers may be adhered together using a thermoset resin. A non-limiting example of thermoset resin may comprise melamine formaldehyde. The cellulosic material used to form the veneer layer may be stained or dyed.

The cellulosic veneer layer 400 may be formed from a cellulosic material such as wood, bamboo, and a combination thereof, and may be naturally occurring or engineered. Non-limiting examples of wood include cherry, maple, oak, walnut, pine, poplar, spruce, chestnut, mahogany, rosewood, teak, ash, hickory, beech, birch, cedar, fir, hemlock, basswood, alder wood, obeche wood, and combinations thereof. The cellulosic veneer layer 400 may comprise pores that are not only present within the body of the cellulosic veneer layer 400 but also exposed on at least one of the upper cellulosic veneer surface 411, lower cellulosic veneer surface 412, and/or the cellulosic veneer side surface 413. The porosity of the cellulosic veneer layer 400 will depend on the bamboo or type of wood selected as the material that forms the cellulosic veneer layer 400.

The benefit of using a cellulosic veneer layer 400 is that the resulting building panel 10 will exhibit authentic decorative features of real wood and/or bamboo (e.g., wood grain, knots, burl, etc.) while minimizing the overall thickness required for the building panel 100 without necessitating artificial print layers. Artificial print layers, such as those on various papers or plastics, have been used as a way to recreate wood grain, knots, burl, etc., while minimizing layer thickness. Such print layers, however, are undesirable because of the limited amount of variation the cellulosic pattern across a large number of panels as compared to the same large number of panels that use veneer formed from real wood and/or bamboo. Stated otherwise, artificial print layers are not preferred because of the repetition in the decorative pattern over large installation areas. Regarding building panels formed entirely from cellulosic materials—although the decorative pattern is formed from real wood grain, knots, burl, etc., such building panels have inferior strength to weight ratios compared to laminate structure building panels using light weight metallic substrates (e.g., aluminum), and such cellulosic building panels may increase some degree of risk of flammability based on more cellulosic material being present in the building panel. Thus, the cellulosic veneer layer 400 helps impart authentic decorative features of a cellulosic material while also balancing flammability, strength, and weight concerns of the overall building panel 10. The cellulosic veneer layer 400 also allows installation of building panels with larger dimensions without adding too much weight to the building system.

According to the present invention the laminate structure may be free of a veneer backing layer (e.g., a cellulosic backing layer such as a paper backing layer) positioned between the cellulosic veneer layer 400 and the adhesive layer 300. Specifically, the laminate structure of the present invention may be free of a veneer backing layer that is applied directly to the lower veneer surface 412 of the cellulosic veneer layer 400. Having no veneer backing layer ensures that the adhesive layer 300 directly contacts the cellulosic veneer layer 400 and further enhances fire safety as there is less cellulosic material to burn in a fire. In other embodiments, however, a cellulosic (e.g., paper) veneer backing layer (not pictured) may be positioned between the adhesive layer 300 and the cellulosic veneer layer 400. A non-limiting example of a veneer backing layer may include a paper backing layer that is applied to the lower veneer surface 412 of a bamboo cellulosic veneer layer 400, thereby directly contacting the lower veneer surface 412 of the bamboo cellulosic veneer layer 400 such that the paper backing layer is positioned between the bamboo cellulosic veneer layer 400 and upper adhesive surface 311 of the adhesive layer 300 (not pictured).

Figure 3:
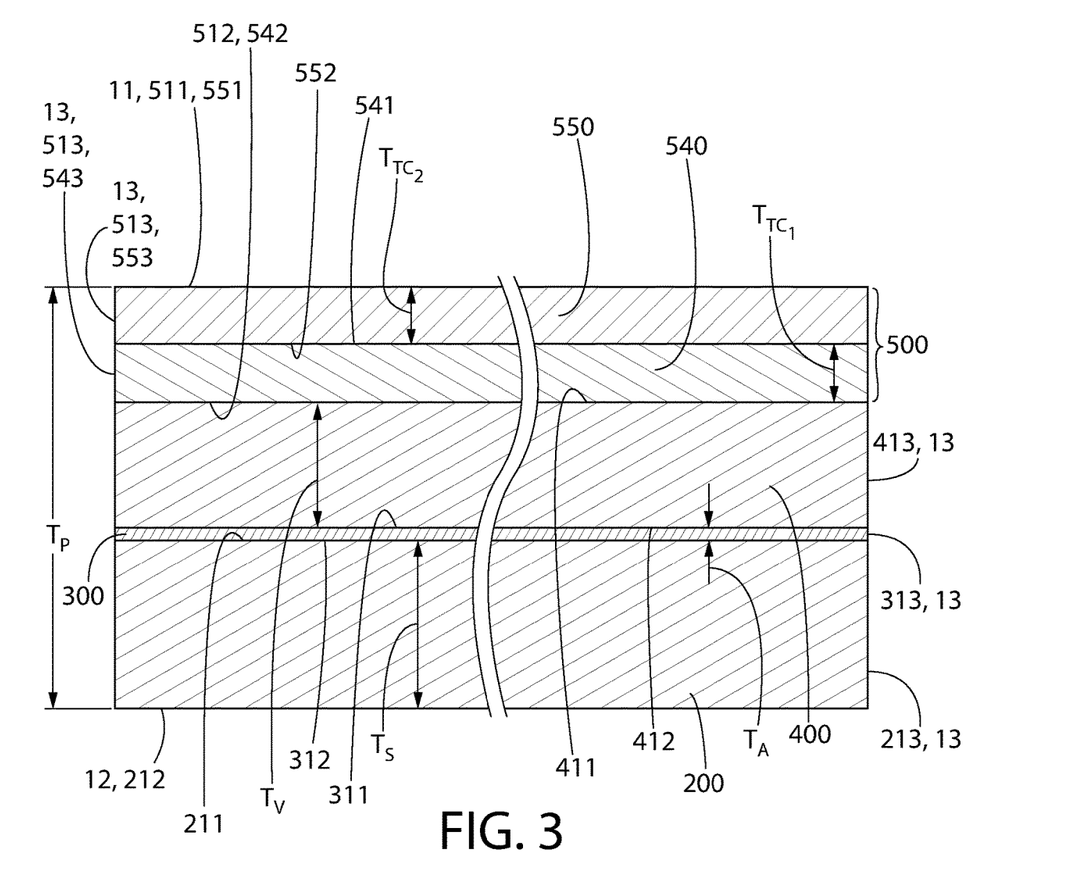
FIG. 3 is cross-sectional view of a building panel according to other embodiments of the present invention, the cross-sectional view being along the II line set forth in FIG. 1.
Figure 4:
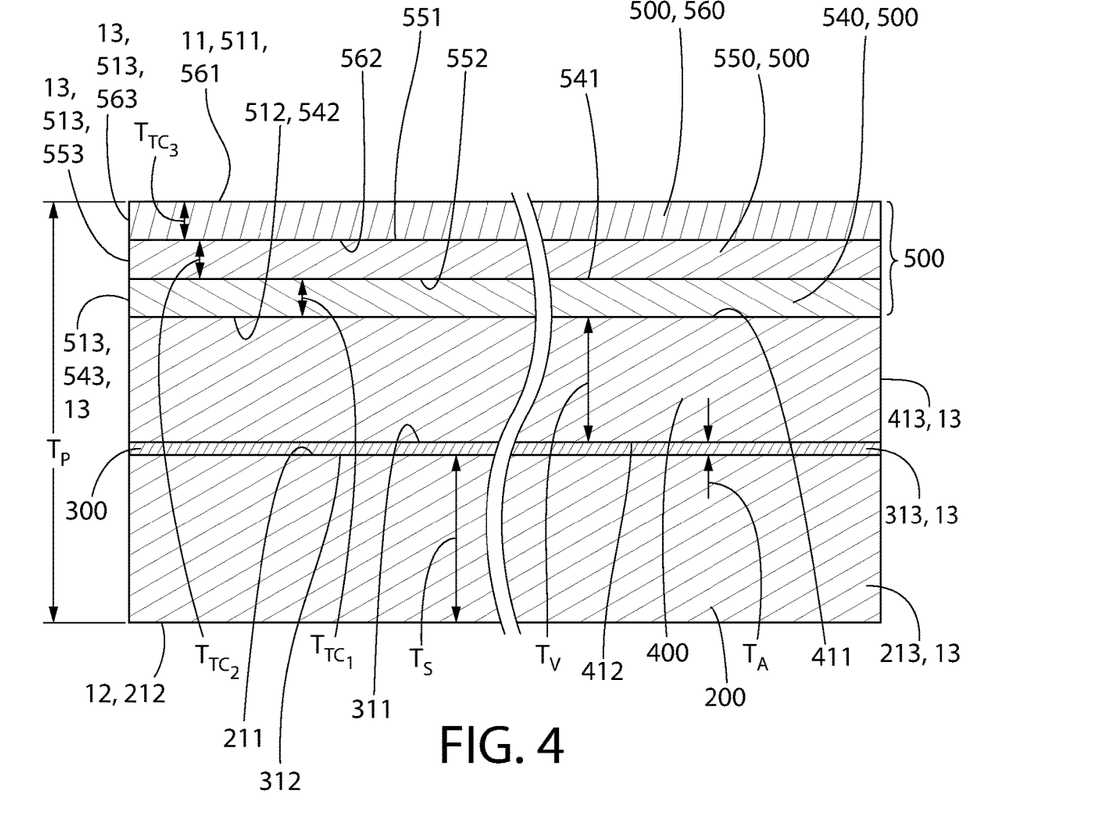
FIG. 4 is cross-sectional view of a building panel according to other embodiments of the present invention, the cross-sectional view being along the II line set forth in FIG. 1.

Referring now to FIGS. 2-4, a topcoat layer 500 may be atop the veneer layer 400. The topcoat layer 500 may be comprised of a single integral layer (FIG. 2) or a plurality of sub-layers 540, 550, 560 (FIGS. 3 and 4). Referring now to FIG. 2, the topcoat layer 500 may comprises an upper topcoat surface 511 and a lower topcoat surface 512 opposite the upper topcoat surface 511. The topcoat layer 500 may comprise a topcoat side surface 513 that extends from the upper topcoat surface 511 to the lower topcoat surface 512 and forms a perimeter of the topcoat layer 500. The topcoat side surface 513 may form a portion of the major side surface 13 of the building panel 10. Stated otherwise, the major side surface 13 of the building panel 10 may comprise the topcoat side surface 513. The topcoat layer 500 may have a topcoat thickness "$t_{TC}$" ranging from about 3 mils to about 20 mils—including all values and sub-ranges there-between—as measured from the upper topcoat surface 511 to the lower topcoat surface 512.

The topcoat layer 500 may be clear or substantially clear. For the purposes of this application, the phrases "substantially clear" or "substantially transparent" refers to materials that have the property of transmitting light in such a way that a normal, human eye (i.e., one belonging to a person with so-called "20/20" vision) or a suitable viewing device can see through the material distinctly. The level of transparency should generally be one which permits a normal, human eye to distinguish objects having length and width on the order of at least 0.5 inches, and should not significantly distort the perceived color of the original object. The topcoat layer 500 should be substantially clear (or substantially transparent) such that the underlying decorative features 30 provide by the veneer layer can be visible from the upper major surface 11 of the building panel 10, as discussed further herein.

The topcoat layer 500 may be formed from a topcoat composition comprising an intumescent composition, which is substantially clear. The intumescent composition may comprise three components: an acid-donor compound, a carbonific compound (also referred to as a "carbon donor compound"), and a separate blowing agent. The topcoat composition may optionally comprise topcoat polymer binders, fillers (e.g., silica), and other fire retarding compounds (also referred to as "flame retardant"), as well as other additives such as, but not limited to, adhesion promoters, catalyst, cross-linkers, and ultra-violet stabilizers.

Upon exposure to heat, the intumescent composition is activated by the following chain of reactions among the components: first, the acid generated by the acid donor compound begins to dehydrate the carbonific compound to form a char (also referred to as a "char layer"). As the char is formed, light gases may be generated and released (e.g., carbon monoxide, carbon dioxide). The release of the light gases may be aided by the presence of the separate blowing agent in the intumescent composition. The blowing agent may separately generate and release one or more light gases (e.g., nitrogen, carbon monoxide, carbon dioxide, methane, ammonia, etc.). The generation and release of light gases swell and/or foam the char layer, thereby increasing the volume and decreasing the density of the topcoat layer 500 while forming a protective char layer that includes pockets of air. The release of the gases leaves a non-combustible carbonaceous material (i.e., "foamed char") that acts as an insulative heat-barrier within the topcoat layer 500, which enhances the high lamination integrity of the laminate structure of the present invention at elevated temperatures. The phrase "form a char" refers to carbonizing at least a portion of the topcoat layer 500 from its initial coating composition into a charred composition. The intumescing composition may react to form the insulative heat-barrier at a minimum char temperature of at least 130° C.

The added insulative heat-barrier is especially helpful in preventing the cellulosic veneer layer 400 from igniting at elevated temperatures—especially when the lower major surface 12 of the building panel 10 is exposed to heat from a fire that exists in the active room environment 2 of the ceiling system 1 (as shown in FIG. 5). The insulative heat-barrier created by the intumescent composition slows and prevents further propagation of heat and flame through the topcoat layer 500 and, therefore, through the rest of the building panel 10.

The acid-donor compound may be present in the topcoat composition in an amount ranging from about 2 wt. % to about 20 wt. % based on the total weight of the topcoat composition—including all values and sub-ranges therebetween. The acid-donor compound may be a strong acid (e.g., phosphoric acid) or a compound that forms a strong acid when exposed to heat (i.e., acid-forming compound). Non-limiting examples of acid-donor compounds include mono-ammonium phosphate, di-ammonium phosphate, ammonium dihydrogen phosphate, ammonium polyphosphate, melamine phosphate, guanylurea phosphate, urea phosphate, p-toluenesulphonic acid, phosphoric acid, aluminum tris (dihydrogen phosphate), ammonium sulfate, ammonium borate, and combinations thereof.

The carbonific compound may be present in the topcoat composition in an amount ranging from about 5 wt. % to about 40 wt. % based on the total weight of the topcoat composition—including all values and sub-ranges therebetween. The carbonific compound may include a low molecular weight carbonaceous compound. Non-limiting examples of low molecular weight carbonaceous compounds include starch, erythritol, pentaerythritol, resorcinol, inositol, sorbitol, dextrin, 2-butoxy-1-ethanol, dipropylene glycol monomethyl ether, propylene glycol, 1-butoxy-2-propanol, 2-methoxy-2-methylethylacetate, methyl (n-amyl) ketone, formaldehyde, melamine, methanol, methylal, bis (methoxymethyl)ether; trimethylamine, (dimethylamino) acetonitrile, N,N,N',N'-tetramethyl-methanediamine, N,N-dimethyl-formamide, hexahydro-1,3,5-trimethyl-1,3,5-triazine, methenamine, ethylene glycol, poly(vinyl butyral) and mixtures thereof.

The carbonific compound may also include a carbonific polymer comprising a plurality of hydroxyl groups on the backbone that can react with the acid-donor compound during char-formation. The carbonific polymer may be formed from a two-component system comprising a carbonific pre-polymer and a cross-linker that cure after the topcoat composition is applied to the cellulosic veneer layer 400 (as discussed herein). The resulting carbonific polymer may have a molecular weight of at least about 10,000 MW. The presence of the hydroxyl groups on the carbonific polymer may result in the carbonific polymer being slightly hydrophilic.

The separate blowing agent is a gas-releasing material that may be included in the intumescent composition to achieve additional foaming during char-formation, thereby further lowering the density of the char layer, and in turn providing additional insulative properties to the topcoat layer 500. The blowing agent will begin to be activated at a temperature around that of the char formation temperature. Non-limiting examples of blowing agent include melamine, urea, dicyandiamide, and combination thereof. The blowing agent may be present in the topcoat composition in an amount that is sufficient to foam the topcoat layer 500 during char formation—i.e., in an amount greater than 0 wt. %. According to other embodiments, the separate blowing agent may be present in an amount of 0 wt. % based on the total weight of the topcoat composition because the char-forming reaction between the acid-donor compound and the carbonific compound by itself is sufficient to foam the topcoat composition during char-formation.

The topcoat polymer binder may be present in the topcoat composition in an amount ranging from about 50 wt. % to about 95 wt. %—including all values and sub-ranges therebetween—based on the total weight of the topcoat composition. The topcoat binder may physically stabilize the intumescent composition within the topcoat composition such that the intumescent composition has a substantially uniform distribution throughout the resulting topcoat layer 500.

The topcoat polymer binder may comprise polymer produced from unsaturated monomers. Specifically, the polymer may be a homopolymer or copolymer produced from ethylenically unsaturated monomers, such as styrene, alpha-methylstyrene, polymethylsiloxane, vinyl toluene, ethylene, propylene, vinyl acetate, vinyl chloride, vinylidene chloride, acrylonitrile, acrylamide, methacrylamide, acrylic acid, methacrylic acid, (meth)acryloxy-propionic acid, itaconic acid, aconitic acid, maleic acid, monomethyl maleate, monomethyl fumarate, monomethyl itaconate, various ($C_1$-$C_{20}$) alkyl or ($C_3$-$C_{20}$) alkenyl esters of (meth)acrylic acid, various lacquers, latex-based binders and the like. The expression (meth)acrylic, as used herein, is intended to serve as a generic expression embracing both acrylic and methacrylic acid and esters thereof e.g., methyl (meth)acrylate, ethyl (meth)acrylate, butyl (meth)acrylate, isobutyl (meth) acrylate, 2-ethyl hexyl(meth)acrylate, benzyl (meth)acrylate, lauryl (meth)acrylate, oleyl (meth)acrylate, palmityl (meth)acrylate, stearyl (meth)acrylate and the like. In other embodiments, the topcoat polymer binder may include polymer comprising polyurethane, polyester, polyester-modified polyurethane, or a combination thereof.

According to the present invention, the topcoat polymer binder may comprise the carbonific polymer. Specifically, the topcoat composition may comprise an intumescent composition comprising an acid-donor compound, a carbonific polymer, and optionally separate blowing agent as well as optionally low molecular weight carbonaceous compounds. The intumescent composition may further comprise a non-carbonific topcoat polymer binder.

The topcoat polymer binder (including the carbonific polymer) may have a glass transition temperature Tg ranging from about 10° C. to about 80° C.—including all values and sub-ranges there-between. The char temperature of the intumescent composition may be at least equal to or greater than the glass transition temperature Tg of the topcoat polymer binder. The char temperature of the intumescent composition may be at least about 60° C. greater than the glass transition temperature Tg of the topcoat polymer binder. Under such relationship, the topcoat polymer binder will transition into the molten state at least at the same time as when the intumescent composition begins to form char within the topcoat composition, thereby facilitating the swelling and/or foaming that occurs during char-formation. In other embodiments, at least a portion of the topcoat polymer binder will be in the molten state when the intumescent composition begins to form char within the topcoat composition, thereby facilitating the swelling and/or foaming that occurs during char-formation.

According to some embodiments, the topcoat layer 500 may further comprise a sealant composition (also referred to as "a sealant composition"). The sealant composition may comprise a sealant polymer binder and a flame retardant.

The flame retardants may be present in the topcoat composition in an amount ranging from about 0 wt. % to about 50 wt. %—including all values and sub-ranges there-between—based on the total weight of the topcoat composition. Non-limiting examples of flame retardant may include ammonium hydroxide, magnesium hydroxide, huntite, hydromagnesite, silica, polyphosphate, melamine cyanurate, chloride salts—such as sodium chloride, antimony oxide, and borates, such as calcium borate, magnesium borate, zinc borate, and combinations thereof. The sealant polymer binder may be present in the topcoat layer 500 in an amount ranging from about 5 wt. % to about 100 wt. %—including all values and sub-ranges there-between—based on the total weight of the sealant composition. In some embodiments, the sealant polymer binder may be present in the topcoat layer 500 in an amount ranging from about 10 wt. % to about 95 wt. %—including all values and sub-ranges there-between—based on the total weight of the sealant composition.

The sealant polymer binder may comprise one or more vinyl or acrylic homopolymers or copolymers formed from ethylenically unsaturated monomers such as ethylene or butadiene and vinyl monomers such as styrene, vinyl esters such as vinyl acetate, vinyl propionate, vinyl butyrates, acrylic acid, methacrylic acid, or esters of acrylic acid and/or esters of methacrylic acid. The esters of acrylic or methacrylic acid may have an alkyl ester portion containing 1 to 12 carbon atoms as well as aromatic derivatives of acrylic and methacrylic acid, and can include, for example, acrylic and methacrylic acid, methyl acrylate and methyl methacrylate, ethyl acrylate and ethyl methacrylate, butyl acrylate and butyl methacrylate, propyl acrylate and propyl methacrylate, 2-ethyl hexyl acrylate and 2-ethyl hexyl methacrylate, cyclohexyl acrylate and cyclohexyl methacrylate, decyl acrylate and decyl methacrylate, isodecyl acrylate and isodecyl methacrylate, benzyl acrylate and benzyl methacrylate and various reaction products such as butyl, phenyl, and cresyl glycidyl ethers reacted with acrylic and methacrylic acids. In a preferred embodiment, the sealant binder comprises a self-crosslinking acrylic binder.

According to such embodiments, the topcoat layer 500 is a single integrally formed layer whereby the intumescent composition and the sealant composition and blended together and located between the upper topcoat surface 511 and the lower topcoat surface 512 and surrounded by the topcoat side surface 513 of the topcoat layer 500. In other embodiments, the topcoat layer 500 may comprise the intumescent composition and only the flame retardant while being substantially free of the sealant polymer. In other embodiments, the topcoat layer 500 may comprise the intumescent composition and be substantially free of the sealant composition.

The topcoat layer 500 may be formed by applying the top coat composition directly to the upper cellulosic veneer surface 411 of the cellulosic veneer layer 400, optionally with the addition of a carrier such as water or a VOC-based solvent (i.e., volatile organic compound). The topcoat composition and carrier may be applied by spray, roll-coating, dip coating, curtain coating, brushing, blade coating, or the like. The topcoat composition may then be cured (optionally with the addition of heat) for a period of time, thereby forming the topcoat layer 500 atop the cellulosic veneer layer 400. As previously discussed, the cellulosic veneer layer 400 may comprise pores on the upper cellulosic veneer surface 411. Thus, once the topcoat composition is applied to the upper cellulosic veneer surface 411 of the cellulosic veneer layer 400, at least a portion of the top coat composition may penetrate into the pores present in the cellulosic veneer layer 400 in a direction extending from the upper cellulosic veneer surface 411 toward the lower cellulosic veneer surface 412.

The building panel 10 of the present invention may comprise a laminate structure wherein the topcoat layer 500 is atop the cellulosic veneer layer 400, the cellulosic veneer layer 400 is atop the adhesive layer 300, and the adhesive layer is atop the substrate 200 layer. The overall panel thickness $t_P$ of the building panel 10 may be the summation of the substrate thickness $t_S$, the adhesive thickness $t_A$, the cellulosic veneer thickness $t_V$, and the topcoat thickness $t_{TC}$ as follows:

$$t_P = t_S + t_A + t_V + t_{TC}$$

The upper substrate surface 211 of the substrate layer 200 may directly contact the lower adhesive surface 312 of the adhesive layer 300 and the upper adhesive surface 311 of the adhesive layer 300 may directly contact the lower cellulosic veneer surface 412 of the cellulosic veneer layer 400 such that the adhesive layer 300 adhesively bonds together the cellulosic veneer layer 400 and the substrate layer 200. The lower topcoat surface 512 may directly contact the upper cellulosic veneer surface 411, such that the upper topcoat surface 511 forms at least a portion of the upper major surface 11 of the building panel 10. The lower substrate surface 212 may form at least a portion of the lower major surface 12 of the building panel 10.

Referring now to FIG. 3, other embodiments of the present invention include a topcoat layer 500 comprising a first sub-layer 540 and a second sub-layer 550. The first sub-layer 540 may be directly atop the cellulosic veneer layer 400 and the second sub-layer 550 may be directly atop the first sub-layer 540.

The first sub-layer 540 may comprise a sealant composition (also referred to as "a sealant composition"). The sealant composition may comprise a sealant polymer binder and a flame retardant. The sealant polymer binder may be present in the cellulosic-layer sealant composition in an amount ranging from about 50 wt. % to about 100 wt. %—including all values and sub-ranges there-between—based on the total weight of the sealant composition. The flame retardant may be present in the cellulosic-layer sealant composition in an amount ranging from about 0 wt. % to about 50 wt. %—including all values and sub-ranges there-between—based on the total weight of the cellulosic-layer sealant composition.

The sealant polymer binder may comprise one or more vinyl or acrylic homopolymers or copolymers formed from ethylenically unsaturated monomers such as ethylene or butadiene and vinyl monomers such as styrene, vinyl esters such as vinyl acetate, vinyl propionate, vinyl butyrates, acrylic acid, methacrylic acid, or esters of acrylic acid and/or esters of methacrylic acid. The esters of acrylic or methacrylic acid may have an alkyl ester portion containing 1 to 12 carbon atoms as well as aromatic derivatives of acrylic and methacrylic acid, and can include, for example, acrylic and methacrylic acid, methyl acrylate and methyl methacrylate, ethyl acrylate and ethyl methacrylate, butyl acrylate and butyl methacrylate, propyl acrylate and propyl methacrylate, 2-ethyl hexyl acrylate and 2-ethyl hexyl methacrylate, cyclohexyl acrylate and cyclohexyl methacrylate, decyl acrylate and decyl methacrylate, isodecyl acrylate and isodecyl methacrylate, benzyl acrylate and benzyl methacrylate and various reaction products such as butyl, phenyl, and cresyl glycidyl ethers reacted with acrylic and methacrylic acids. In a preferred embodiment, the sealant binder comprises a self-crosslinking acrylic binder.

The flame retardant of the first sub-layer 540 may include ammonium hydroxide, magnesium hydroxide, huntite, hydromagnesite, silica, polyphosphate, melamine cyanurate, chloride salts—such as sodium chloride, antimony oxide, and borates, such as calcium borate, magnesium borate, zinc borate, and combinations thereof.

The first sub-layer 540 may be formed by applying the sealant composition in a wet-state directly to the upper cellulosic veneer surface 411 of the cellulosic veneer layer 400. The wet-state sealant composition may further comprise a carrier in an amount ranging from about 20 wt. % to about 60 wt. %—including all values and sub-ranges there-between—based on the total weight of the wet-state cellulosic-layer sealant composition. The carrier may be selected from water, an organic solvent, or a combination thereof. In a preferred embodiment, the wet-state sealant composition is a waterborne system having a carrier of water and a low VOC (i.e., volatile organic compound) content—i.e. substantially free of VOC solvents. The sealant binder may be self-crosslinking.

The sealant composition may then be cured (optionally with the addition of heat) for a first time period, thereby forming the first sub-layer 540 atop the cellulosic veneer layer 400. The resulting first sub-layer 540 may comprise a first sub-layer upper surface 541 and a first sub-layer lower surface 542 opposite the first sub-layer upper surface 541. The first sub-layer 540 may have a first sub-layer thickness "$t_{TC1}$" as measured from the first sub-layer upper surface 541 to the first sub-layer lower surface 542. The first sub-layer thickness $t_{TC1}$ may range from 1 mils to 6 mils—including all values and sub-ranged there-between. The first sub-layer 540 may comprise a first sub-layer side surface 543 that extends from the first sub-layer upper surface 541 to the first sub-layer lower surface 542 and forms a perimeter of the first sub-layer 540.

The second sub-layer 550 may be formed by directly applying the previously discussed topcoat composition (i.e., comprising the intumescent composition and optionally the topcoat polymer binder) to the first sub-layer upper surface 541 of the first sub-layer 540. The topcoat composition may then be cured (optionally with the addition of heat) for a second time period of time, thereby forming the second sub-layer 550 atop the first sub-layer 540. The resulting second sub-layer 550 may comprise a second sub-layer upper surface 551 and a second sub-layer lower surface 552 opposite the second sub-layer upper surface 551.

The second sub-layer 550 may have a second sub-layer thickness "$t_{TC2}$" as measured from the second sub-layer upper surface 551 to the second sub-layer lower surface 552. The second sub-layer thickness $t_{TC2}$ may range from about 3 mils to about 20 mils. The second sub-layer 550 may comprise a second sub-layer side surface 553 that extends from the second sub-layer upper surface 551 to the second sub-layer lower surface 552 and forms a perimeter of the second sub-layer 550.

The first sub-layer side surface 543 and the second sub-layer side surface 553 may form at least a portion of the topcoat side surface 513. Stated otherwise, the topcoat side surface 513 may comprise the first sub-layer side surface 543 and the second sub-layer side surface 553. The overall topcoat thickness $t_{TC}$ of topcoat layer 500 may be the summation of the first sub-layer thickness $t_{TC1}$ and the second sub-layer thickness $t_{TC2}$—as follows:

$$t_{TC}=t_{TC1}+t_{TC2}$$

According to these embodiments, the first sub-layer lower surface 542 of the first sub-layer 540 may contact the upper cellulosic veneer surface 411 of the cellulosic veneer layer 400. The first sub-layer upper surface 541 may contact the second sub-layer lower surface 552 of the second sub-layer 550. The second sub-layer upper surface 551 may form at least part of the upper topcoat surface 511 of the topcoat layer 500. The first sub-layer lower surface 542 may form at least part of the lower topcoat surface 512 of the topcoat layer 500. The second sub-layer upper surface 551 may form at least part of the upper major surface 11 of the building panel 10.

As previously discussed, the cellulosic veneer layer 400 may comprise pores on the upper cellulosic veneer surface 411. Once the cellulosic-layer sealant composition of the first sub-layer 540 is applied to the upper cellulosic veneer surface 411 of the cellulosic veneer layer 400, at least a portion of the cellulosic-layer sealant composition may penetrate into the pores present in the cellulosic veneer layer 400 in a direction extending from the upper cellulosic veneer surface 411 towards the lower cellulosic veneer surface 412. As a result, the first sub-layer 540 may form a physical barrier that at least partially seals the upper cellulosic veneer surface 411 of the cellulosic veneer layer 400 from the second sub-layer 550. The physical barrier formed by the first sub-layer 540 may prevent at least some of the second sub-layer 550 (which comprises the intumescent composition) from penetrating into the pores on the upper cellulosic veneer surface 411 of the cellulosic veneer layer 400. According to some embodiments, the char-forming insulative barrier that is created by intumescent composition of the second sub-layer 540 may be separated from the upper cellulosic veneer surface 411 of the cellulosic veneer layer 400 by a distance equal to the first sub-layer thickness $t_{TC1}$.

Referring now to FIG. 4, other embodiments provide that the topcoat layer 500 may further comprise a third sub-layer 560 atop the second sub-layer 550, which is atop the first sub-layer 540 that is atop the cellulosic veneer layer 400. The third sub-layer 560 may be formed from a moisture barrier composition that imparts moisture barrier properties to the resulting third sub-layer 560. The moisture barrier composition may be comprised of hydrophobic polymeric binder, which may or may not be cross-linked, as well as various additives and fillers. Non-limiting examples of hydrophobic polymeric binder produced from unsaturated monomers. Specifically, the hydrophobic polymer may be a homopolymer or copolymer produced from ethylenically unsaturated monomers, such as styrene, alpha-methylstyrene, vinyl toluene, ethylene, propylene, vinyl acetate, vinyl chloride, vinylidene chloride, acrylonitrile, acrylamide, methacrylamide, acrylic acid, methacrylic acid, (meth)acryloxy-propionic acid, itaconic acid, aconitic acid, maleic acid, monomethyl maleate, monomethyl fumarate, monomethyl itaconate, various ($C_1$-$C_{20}$) alkyl or ($C_3$-$C_{20}$) alkenyl esters of (meth)acrylic acid and the like. The expression (meth) acrylic, as used herein, is intended to serve as a generic expression embracing both acrylic and methacrylic acid and esters thereof e.g., methyl (meth)acrylate, ethyl (meth)acrylate, butyl (meth)acrylate, isobutyl meth)acrylate, 2-ethyl hexyl(meth)acrylate, benzyl (meth)acrylate, lauryl (meth) acrylate, oleyl (meth)acrylate, palmityl (meth)acrylate, stearyl (meth)acrylate and the like. In other embodiments, the hydrophobic polymeric binder may include polymer comprising polyurethane, polyester, polyester-modified polyurethane, epoxy or a combination thereof.

The hydrophobic polymer may be present in an amount ranging from about 70 wt. % to about 100 wt. %—including all values and sub-ranges there-between—based on the total weight of the moisture barrier composition.

The third sub-layer 560 may be formed by applying the moisture barrier composition with the addition of one or more organic solvents. Non-limiting examples of organic solvents include toluene, ethanol, acetone, butyl acetate, methyl ethyl ketone, ethyl 3-ethoxypropionate. The barrier composition may be present relative to the organic solvent in a weight ratio ranging from about 5:1 to about 1:20. After application to the second sub-layer upper surface 551, the moisture barrier composition may be dried for a third period of time, optionally at an elevated temperature, sufficient to drive off any organic solvent. The resulting third sub-layer 560 may be a continuous or discontinuous coating having an third sub-layer upper surface 561 and a third sub-layer lower surface 562 opposite the third sub-layer upper surface 561. The third sub-layer 560 may have a third sub-layer thickness "$t_{TC3}$" as measured from the third sub-layer upper surface 561 to the third sub-layer lower surface 562. The third sub-layer thickness $t_{TC3}$ may range from about 1 mils to about 6 mils. The third sub-layer 560 may comprise a third sub-layer side surface 563 that extends from the third sub-layer upper surface 561 to the third sub-layer lower surface 562 and forms a perimeter of the second sub-layer 560.

According to such embodiments, the overall topcoat thickness $t_{TC}$ of topcoat layer 500 may be the summation of the first sub-layer thickness $t_{TC1}$, the second sub-layer thickness $t_{TC2}$, and the third sub-layer thickness $t_{TC3}$—as follows:

$$t_{TC}=t_{TC1}+t_{TC2}+t_{TC3}$$

According to these other embodiments, the first sub-layer lower surface 542 of the first sub-layer 540 may contact the upper cellulosic veneer surface 411 of the cellulosic veneer layer 400. The first sub-layer upper surface 541 may contact the second sub-layer lower surface 552 of the second sub-layer 550. The second sub-layer upper surface 551 may contact the third sub-layer lower surface 562 of the second sub-layer 560. The third sub-layer upper surface 561 may form at least part of the upper topcoat surface 511 of the topcoat layer 500. The first sub-layer lower surface 542 may form at least part of the lower topcoat surface 512 of the topcoat layer 500. The third sub-layer upper surface 561 may form at least part of the upper major surface 11 of the building panel 10.

According to other embodiments, the topcoat layer 500 may comprise only the second sub-layer 550 and the third sub-layer 560 without the first sub-layer 540 (not pictured). In such embodiments, the second sub-layer 550 may be directly atop the upper cellulosic veneer surface 411 of the cellulosic veneer layer 400 and the third sub-layer 560 may be directly atop the second sub-layer upper surface 551 of the second sub-layer 550. In such embodiments, the second sub-layer 550 acts as a sealant and is capable of sealing the porous upper cellulosic veneer surface 411 of the cellulosic veneer layer 400, while simultaneously acting as a char-forming intumescent layer.

According to other embodiments, the topcoat layer 500 may comprise only the second sub-layer 550. In such embodiments, the second sub-layer 550 acts as a sealant and is capable of sealing the porous upper cellulosic veneer surface 411 of the cellulosic veneer layer 400, while simultaneously acting as a char-forming intumescent layer, in situations where moisture resistance of the coating is not required.

The building panel 10 of the present invention may be formed by first cleaning or degreasing the upper major surface of the substrate layer by either mechanical or chemical means, or a combination thereof. Non-limiting examples of degreasing may include sand blasting, or using a chemical bath to clean the surfaces of the substrate. The adhesive composition may then be heated to an application temperature ranging from about 120° C. to about 160° C., thereby lowering the viscosity of the adhesive composition to a flowable liquid or semi-liquid state. The adhesive composition may then be applied to at least one of the upper substrate surface 211 or the lower cellulosic veneer surface 412. The adhesive composition may be applied by roll coating, spray coating, dip coating, or the like.

The adhesive composition of the present invention may develop significant green strength within about 30 seconds of being applied to at least one of the substrate layer or the cellulosic veneer layer 400. The adhesive composition may also have an open time up to about 60 seconds after being applied to the substrate layer 200. Before the open time expires, the upper substrate surface 211 is mated to the lower cellulosic veneer surface 412 with the adhesive composition being present there-between, thereby bonding the upper substrate surface 211 to the lower cellulosic veneer surface 412 via the adhesive composition. Pressure may then be applied to at least one of the upper cellulosic veneer surface 411 of the cellulosic veneer layer 400 or the lower substrate surface 212 of the substrate layer 200 to ensure proper adhesive bonding.

Each sub-layer 540, 550, 560 may be individually applied by spray, roll-coating, dip coating, curtain coating, brushing, blade coating, or the like. Specifically, the first sub-layer 540 may be applied to the upper cellulosic veneer surface 411 of the cellulosic veneer layer 400. The first sub-layer 540 may then be optionally heated to a temperature ranging from about 10° C. to about 60° C. to partially or fully cure the first sub-layer 540. The second sub-layer 550 may then be applied to the first sub-layer supper surface upper surface 541. The second sub-layer 550 may then be optionally heated to a temperature ranging from about 10° C. to about 60° C. to partially or fully cure the second sub-layer 550. The third sub-layer 560 may then be applied to the second sub-layer upper surface 551. The third sub-layer 560 may then be optionally heated to a temperature ranging from about 10° C. to about 60° C. to partially or fully cure the third sub-layer 560—thereby resulting in the laminate structure of the present invention. The laminate structure may then be heated in an oven to fully cure the adhesive layer 300 and the topcoat layer 500 for a fourth period of time.

According to the present invention, a laminate structure comprising the adhesive layer 300 and the topcoat layer 500 in combination with the cellulosic veneer layer 400 and substrate layer 200 results in a building panel 10 having superior lamination integrity during not only normal use in an interior environment, but also during a fire in the active room environment 2. Specifically, two mechanisms achieve superior performance. The polyester-modified polyurethane allows for hot-melt application of the adhesive that quickly forms significant green strength and does not sacrifice the open time that is needed to properly apply the adhesive composition during manufacture. Additionally, the presence of moisture-cured polymers in the adhesive increases the degree of cross-linking in the polymeric binder, increasing the softening temperature of the adhesive, which in turn delays delamination at high temperatures. The resulting adhesive layer exhibits superior performance during manufacture and under high temperature conditions that translates into a substantial delay in the deformation of the adhesive layer 300 under a load at elevated temperatures, thereby delaying delamination of the veneer layer 400 from the substrate layer 200 at elevated temperatures—especially those resulting from a fire in the active room environment 2.

Furthermore, the intumescent composition of the topcoat layer 500 helps provide an insulative heat-barrier to the cellulosic veneer layer 400, thereby helping prevent the cellulosic veneer layer 400 from igniting during a fire and propagating through the building panel 10. The multi-layered topcoat layer 500 comprising the cellulosic-layer sealant first sub-layer 540 may also at least partially seal the pores and the upper cellulosic veneer surface 411 such that at least a portion of the char-forming insulative barrier is formed at a distance separated from the upper cellulosic veneer surface 411 of the cellulosic veneer layer 400—further protecting the cellulosic veneer layer 400 from igniting in a fire. Additionally, the moisture sealant composition of the third sub-layer 560 ensures that the intumescent composition of the underlying sub-layers 540, 550 remains active for prolonged periods of time in case an interior space catches fire years after initial installation.

Referring to FIG. 5, the building panel 10 of the present invention may be a ceiling panel (as shown installed in the ceiling system of FIG. 5), a wall panel, or the like. The lower major surface 12 of the ceiling panel 10 of the present invention may face the plenum space 3 of an interior space of a ceiling system 1. The upper major surface 11 of the ceiling panel 10 of the present invention may face the active space 2 of an interior space of a ceiling system 1.

The laminate structure of the present invention results in a building panel 10 that meets at least the Class B, preferably Class A, fire rating as measured by the methodology set forth in ASTM E84—Standard Test Method for Surface Burning Characteristics of Building Materials—without the aid of external supports one or more of the major surfaces 11, 12 of the building panel 10—such as rods, bars and/or chicken wire.

In non-exemplified embodiments, the present invention may include a building panel having an upper major surface opposite a lower major surface, the building panel comprising a cellulosic layer (also referred to as "cellulosic substrate" in this embodiment) and a topcoat layer. The cellulosic substrate is self-supporting and comprises an upper cellulosic surface and a lower cellulosic surface opposite the upper cellulosic surface. Non-limiting examples of a cellulosic substrate may include MDF board, wooden planks, or the like. The cellulosic substrate may have a cellulosic substrate thickness as measured from the lower cellulosic surface to the upper cellulosic surface that ranges up to about 3 inches—including all values and sub-ranges there-between.

The building panel of such embodiments may have the topcoat layer applied to at least one of the upper cellulosic surface or the lower cellulosic surface of the cellulosic layer. The topcoat layer comprises an upper topcoat surface opposite a lower topcoat surface. According to such embodiments, the lower topcoat surface of the topcoat may directly contact the upper cellulosic surface of the cellulosic substrate. The topcoat layer comprises at least the second sub-layer and optionally the first sub-layer and the third sub-layer, as previously discussed. The upper major surface of the building panel may comprise the upper topcoat surface of the topcoat layer and the lower major surface of the building panel may comprise the lower cellulosic surface of the cellulosic layer.

The following examples are prepared in accordance with the present invention. The present invention is not limited to the examples described herein.

EXAMPLES

Experiment 1

A first experiment was performed by preparing two building panels according to the following methodology. A wood veneer layer was adhered to an aluminum substrate layer using a hot-melt polyurethane adhesive containing flame retardant. The wood veneer layer has a thickness of about 30 mils and the aluminum substrate has a thickness of about 27 mils. For one of the building panels, the exposed upper surface of the wood veneer layer was coated with a traditional UV-curable topcoat coating comprising acrylate-functional polymer, resulting in a topcoat thickness ranging from about 1 mil to about 2 mils. The other building panel remained uncoated. Each of the building panels were then subjected to an ASTM E-84 test to measure surfaces flame spread and smoke density. The results are provided below in Table 1.

TABLE 1

|  | Ex. 1 | Control Ex. 1 |
| --- | --- | --- |
| Aluminum Substrate Thickness (mils) | 40 | 40 |
| Topcoat | Y | N |
| Flame Retardant in Topcoat | N | N |
| Flame Spread | 235 | 235 |
| Smoke Developed | 70 | 75 |
| Classification | NC | NC |

As demonstrated by Table 1, the presence of the UV-curable coating—a traditional coating choice for such products—did not change the fire performance of this construction. The construction is deemed not classifiable or "NC" by the building code, with or without the coating.

Experiment 2

A second experiment was performed by preparing two building panels according to the following methodology. A wood veneer layer was adhered to a aluminum substrate layer using a hot-melt polyurethane adhesive containing flame retardant. The wood veneer layer has a thickness of about 30 mils and the aluminum substrate has a thickness of about 40 mils. For one of the building panels, the exposed upper surface of the wood veneer layer was coated with a water-borne acrylic coating that resulted in a topcoat thickness ranging from about 1 mil to about 2 mils. The other building panel remained uncoated. Each of the building panels were then subjected to an ASTM E-84 test to measure surfaces flame spread and smoke density. The results are provided below in Table 2.

TABLE 2

|  | Ex. 2 | Control Ex. 2 |
| --- | --- | --- |
| Aluminum Substrate Thickness (mils) | 40 | 40 |
| Topcoat | Y | N |
| Flame Retardant in Topcoat | N | — |
| Flame Spread | 40 | 235 |
| Smoke Developed | 60 | 75 |
| Classification | B | NC |

As demonstrated by Table 2, the presence of the topcoat improved the fire performance of the building panel. However, to receive a Class A rating, the building code requires a flame spread of 25 or less, and smoke developed of less than 450. Consequently, the fire performance of Experiment 2 still requires improvement.

Experiment 3

A third experiment was performed by preparing an additional building panel according to the same methodology of Experiment 2 except that the upper surface of the wood veneer layer was coated with the water-borne acrylic coating that was further modified to contain 8 wt. % of flame retardant. The resulting topcoat had a thickness ranging from about 1 mil to about 2 mils. The building panel of Experiment 3 was then subjected to an ASTM E-84 test to measure surfaces flame spread and smoke density. The results of Experiments 2 and 3 are provided below in Table 3.

TABLE 3

|  | Ex. 3 | Ex. 2 | Control Ex. 2 |
| --- | --- | --- | --- |
| Aluminum Substrate Thickness (mils) | 40 | 40 | 40 |
| Topcoat | Y | Y | N |
| Flame Retardant in Topcoat | Y | N | — |
| Flame Spread | 45 | 40 | 235 |
| Smoke Developed | 75 | 60 | 75 |
| Classification | B | B | NC |

As demonstrated by Table 3, when accounting for the known test result variations between Experiments 2 and 3, the addition of the traditional flame retardant to the topcoat had no impact on the fire performance (as measured by the ASTM E-84 test) of the construction as compared to the material without flame retardant. Consequently, an improved, non-traditional flame barrier is required.

Experiment 4

A fourth experiment was performed to test a single topcoat layer comprising sealant and an intumescent composition—whereby the fourth experiment was performed by preparing a first building panel according to a methodology of the present invention and a second building panel that is uncoated as a control.

A wood veneer layer was adhered to an aluminum substrate layer using a hot-melt polyurethane adhesive containing flame retardant. The wood veneer layer has a thickness of about 30 mils and the aluminum substrate has a thickness of about 40 mils. For one of the building panels, the exposed upper surface of the wood veneer layer was coated with a wood sealant in a west-state comprising an inorganic salt flame retardant as well as a 3-part intumescent composition that comprises (1) pentaerthritol in an amount ranging from about 5 wt. % to about 40 wt. %, (2) poly (vinyl butyral) in an amount ranging from about 5 wt. % to about 40 wt. %, and (3) antimony pentoxide in an amount ranging from about 1 wt. % to about 5 wt. %—all amounts are based on the total weight of the wet-state topcoat and the remaining amounts being a carrier. The wood sealant further comprises silica. The resulting topcoat has a thickness ranging from about 2 mils to about 5 mils, and a total application weight of about 55 g/ft$^2$ to about 60 g/ft$^2$. The other building panel remained uncoated. Each of the building panels were then subjected to an ASTM E-84 test to measure surfaces flame spread and smoke density. The results are provided below in Table 4.

TABLE 4

|  | Ex. 4 | Control Ex. 3 |
| --- | --- | --- |
| Aluminum Substrate Thickness (mils) | 40 | 40 |
| Sealant Topcoat | Y | N |
| Flame Retardant in Topcoat | Y | — |
| Intumescent in Topcoat | Y | — |
| Flame Spread | 20 | 235 |
| Smoke Developed | 110 | 75 |
| Classification | A | NC |

As demonstrated by Table 4, the addition of the intumescent composition shifted the fire rating to one that had a Class A fire spread according to ASTM E-84.

Experiment 5

A fifth experiment was performed to test separate layers of a topcoat sealant and an intermediate layer comprising an intumescent composition—whereby the fifth experiment was performed by preparing five building panels according to a methodology of the present invention and a sixth building panel that is uncoated as a control.

A wood veneer layer was adhered to an aluminum substrate layer using a hot-melt polyurethane adhesive containing flame retardant. The wood veneer layer has a thickness of about 30 mils. The aluminum substrate used has a thickness ranging from about 40 mils to about 62 mils—as described further herein. Four of the building panels had the exposed upper surface of the wood veneer layer coated with an intermediate coating that included an intumescent composition comprising polyphosphate comprised of phosphoric acid or polyphosphate formed from phosphoric acid in an amount ranging from about 5 wt. % to about 25 wt. % and amine-containing compounds comprising melamine, trimethyl amine, and methenamine in an amount ranging from about 5 wt. % to about 25 wt. %—all amounts are based on the total weight of the intermediate layer in the wet-state and the remaining amounts being a carrier. The intermediate coating further comprises silica in an amount ranging from a non-zero value up to about 5 wt. % based on the total weight of the intermediate layer. The resulting intermediate coating for the four building panels having thicknesses ranging from about 2 mils to about 4 mils. A topcoat of a standard commercial clear lacquer sealant comprised of various hydrocarbons was then applied to the intermediate coating to provide a barrier of moisture protection to the intumescent coating. The veneer layer of the sixth building panel of this experiment remained uncoated.

Each of the building panels were then subjected to an ASTM E-84 test to measure surfaces flame spread and smoke density. The results are provided below in Table 5.

TABLE 5

|  | Ex. 5 | Ex. 6 | Ex. 7 | Ex. 8 | Ex. 9 | Control Ex. 4 |
|---|---|---|---|---|---|---|
| Aluminum Substrate Thickness (mils) | 40 | 40 | 40 | 50 | 62 | 40 |
| Sealant Topcoat | Y | Y | Y | Y | Y | N |
| Flame Retardant in Topcoat | N | N | N | N | N | — |
| Flame Retardant in Intermediate Coat | N | N | N | N | N | — |
| Intumescent in Intermediate Coat | Y | Y | Y | Y | Y | — |
| Application Rate of Intermediate Coat (g/ft$^2$) | 18 | 30 | 45 | 28 | 30 | — |
| Flame Spread | 10 | 15 | 20 | 25 | 25 | 235 |
| Smoke Developed | 100 | 110 | 115 | 90 | 70 | 75 |
| Classification | A | A | A | A | A | NC |

As demonstrated by Table 5, the addition of the intumescent composition shifted the fire rating to one that had a superior flame spread rating across a range of application rates and aluminum thicknesses. Additionally, superior fire rating was still achieved even with the sealant topcoat, thereby enhancing moisture resistance to the veneer layer of the building panel. Although there was a slight decrease in performance of smoke developed rating for the panels of Experiments 5 to 9 as compared to Control Example 4, the panels of Experiments 5 to 9 still performed well below the required threshold of 450—this consideration for smoke developed is the same for all following experiments and examples.

Experiment 6

A sixth experiment was performed to test separate layers of a topcoat sealant and an intermediate layer comprising an intumescent composition—whereby the sixth experiment was performed by preparing one building panels according to a methodology of the present invention and a second building panel that is uncoated as a control.

A wood veneer layer was adhered to an aluminum substrate layer using a hot-melt polyurethane adhesive containing flame retardant. The wood veneer layer has a thickness of about 30 mils and the aluminum substrate has a thickness of about 50 mils. For one of the building panels, the exposed upper surface of the wood veneer layer was coated with an intermediate coat comprising a phosphate based flame retardant and intumescent composition. The intumescent composition comprises organo and polyphosphates in an amount ranging from about 5 wt. % to about 80 wt. % as well as hydroxyl compounds including alcohols such as methanol and isopropanol in an amount ranging from about 5 wt. % to about 50 wt. %—the amounts are based on the total weight of the intermediate layer in the wet-state. The intermediate layer further comprises silica in an amount ranging from a non-zero value up to about 5 wt. % based on the total weight of the intermediate layer in the wet state. The remaining amounts of the intermediate layer in the wet-state being a carrier. A topcoat of sealant of a standard commercial clear lacquer was then applied to the intermediate coating to provide a barrier of moisture protection to the intumescent coating. The total thickness of the intermediate coating and the topcoat ranges from about 2 mil to about 4 mils. The other building panel remained uncoated. Each of the building panels were then subjected to an ASTM E-84 test to measure surfaces flame spread and smoke density. The results are provided below in Table 6.

TABLE 6

|  | Ex. 10 | Control Ex. 5 |
|---|---|---|
| aluminum Substrate Thickness (mils) | 50 | 50 |
| Sealant Topcoat | Y | N |
| Flame Retardant in Topcoat | Y | — |
| Intumescent in Intermediate coat | Y | — |
| Flame Spread | 25 | 50 |
| Smoke Developed | 55 | 70 |
| Classification | A | B |

As demonstrated by Table 6, the addition of the intumescent composition shifted the fire rating to one that had a Class A flame spread according to ASTM E-84.

Experiment 7

A seventh experiment was performed to test a single topcoat layer comprising a sealant and intumescent composition—whereby the seventh experiment was performed by preparing four building panels according to a methodology of the present invention and a fifth building panel that is uncoated as a control.

A wood veneer layer was adhered to an aluminum substrate layer using a hot-melt polyurethane adhesive containing flame retardant. The wood veneer layer has a thickness of about 30 mils. The aluminum substrate used has a thickness ranging from about 40 mils to about 62 mils—as described further herein. Four of the building panels had the exposed upper surface of the wood veneer layer coated with a topcoat comprising an aqueous wood sealant comprising acrylic polymer/co-polymer blend, ethanol and ether compounds from about 5 wt. % to about 95 wt. % and as well as an intumescent composition comprising polyphosphates such as phosphoric acid in an amount ranging from about 20 wt. % to about 40% wt. %, organophosphates in an amount ranging from about 30 wt. % to about 40 wt. %, butoxy ethanol in an amount less than about 10 wt. %, sulphonic acid in an amount ranging from about 30 wt. % to about 50 wt. %, and polyalkylene oxide modified polydimethylsiloxane in an amount less than 5 wt. %—the amounts being based on the total weight of the topcoat in the wet-state and the remaining amounts being a carrier. The wet-state topcoat coating further comprises silica in an amount ranging from about 5 wt. % to about 15 wt. % based on the total weight of the topcoat in the wet-state. The topcoat on each of first four building panels had a thicknesses ranging from about 2 mils to about 4 mils. The veneer layer of the fifth building panel of this experiment remained uncoated.

Each of the building panels were then subjected to an ASTM E-84 test to measure surfaces flame spread and smoke density. The results are provided below in Table 7.

TABLE 7

|  | Ex. 11 | Ex. 12 | Ex. 13 | Ex. 14 | Control Ex. 6 |
|---|---|---|---|---|---|
| Aluminum Substrate Thickness (mils) | 40 | 40 | 40 | 62 | 40 |
| Sealant Topcoat | Y | Y | Y | Y | N |
| Flame Retardant in Topcoat | Y | Y | Y | Y | — |
| Intumescent in Topcoat | Y | Y | Y | Y | — |
| Application Rate of Intermediate Coat (g/ft$^2$) | 33 | 42 | 46 | 42 | — |
| Flame Spread | 15 | 15 | 20 | 15 | 235 |
| Smoke Developed | 120 | 110 | 110 | 170 | 75 |
| Classification | A | A | A | A | NC |

As demonstrated by Table 7, the addition of the intumescent system shifted the fire rating to one that had a Class A flame spread according to ASTM E-84 across a range of application rates and thicknesses of aluminum.

Experiment 8

An eighth experiment was performed to test separate layers of a topcoat sealant and an intermediate layer comprising an intumescent composition—whereby the eighth experiment was performed by preparing one building panels according to a methodology of the present invention and a second building panel that is uncoated as a control.

A wood veneer layer was adhered to an aluminum substrate layer using a hot-melt polyurethane adhesive containing flame retardant. The wood veneer layer has a thickness of about 30 mils and the aluminum substrate has a thickness of about 40 mils. For one of the building panels, the exposed upper surface of the wood veneer layer was coated with an intermediate coat comprising a flame retardant and intumescent composition. The intumescent composition comprises phosphoric acid in an amount ranging from about 5 wt. % to about 65 wt. % and dihydrogen phosphate in an amount ranging from about 5 wt. % to about 35 wt. %—the amounts are based on the total weight of the intermediate layer in the wet-state and the remaining amounts being a carrier. A topcoat of standard commercial clear lacquer sealant was then applied to the intermediate coating to provide a barrier of moisture protection to the intumescent coating. The total thickness of the intermediate coating and the topcoat ranges from about 4 mils to about 6 mils. The other building panel remained uncoated. Each of the building panels were then subjected to an ASTM E-84 test to measure surfaces flame spread and smoke density. The results are provided below in Table 8.

TABLE 8

|  | Ex. 15 | Control Ex. 7 |
|---|---|---|
| Aluminum Substrate Thickness (mils) | 40 | 40 |
| Sealant Topcoat | Y | N |
| Flame Retardant in Topcoat | N | — |
| Intumescent in Intermediate coat | Y | — |
| Flame Spread | 10 | 235 |
| Smoke Developed | 135 | 75 |
| Classification | A | NC |

As demonstrated by Table 8, the addition of the intumescent composition shifted the fire rating to one that had a Class A flame spread according to ASTM E-84.

It is to be understood that other embodiments may be utilized and structural and functional modifications may be made without departing from the scope of the present invention. Thus, the spirit and scope of the invention should be construed broadly as set forth in the appended claims.

What is claimed is:

1. A ceiling panel comprising a laminate structure, the laminate structure comprising:
    a cellulosic veneer layer adhesively bonded to a substrate by an adhesive comprising a polyurethane polymer; and
    a topcoat layer applied to the cellulosic layer that is substantially impervious to ambient moisture and comprising an intumescent composition, the topcoat layer having an uppermost exposed surface, the topcoat layer comprising:
    a barrier sub-layer that is substantially impervious to ambient moisture, the barrier sub-layer comprising a first polymer having a first glass transition temperature, the first polymer present in an amount ranging from about 70 wt. % to about 100 wt. % based on the total weight of the barrier sub-layer;
    an intumescent sub-layer comprising the intumescent composition and a second polymer having a second glass transition temperature; wherein the barrier sub-layer is atop the intumescent sub-layer and the intumescent sub-layer is atop the cellulosic layer; and wherein the first glass transition temperature being equal to or less than the second glass transition temperature; and
    wherein the barrier sub-layer contacts the intumescent sub-layer, and the uppermost exposed surface of the topcoat layer is formed by the barrier sub-layer.

2. The ceiling panel according to claim 1, wherein the topcoat layer is substantially clear.

3. The ceiling panel according to claim 1, wherein the topcoat layer directly contacts the first major surface of the cellulosic veneer layer and the adhesive layer directly contacts the second major surface of the cellulosic veneer layer.

4. The ceiling panel according to claim 1, wherein the intumescent composition comprises:
    a carbon donor compound; and
    an acid donor compound comprising ammonium phosphate, di-ammonium phosphate, ammonium dihydrogen phosphate, ammonium polyphosphate, melamine phosphate, guanylurea phosphate, urea phosphate, p-toluenesulphonic acid, ammonium sulfate, ammonium borate, or combinations thereof.

5. The ceiling panel according to claim 1, wherein the adhesive composition is a hot-melt composition and the thermoplastic polyurethane polymer comprises polyester modified polyurethane.

6. The ceiling panel according to claim 1, wherein the substrate is metallic and has a thickness ranging from about 25 mils to 80 mils.

7. The ceiling panel according to claim 1, wherein the first polymer of the barrier layer has a glass transition temperature ranging from 30° C. to 80° C.

8. The ceiling panel according to claim 1, wherein the first polymer comprises one or more of vinyl or acrylic homopolymers or copolymers formed from ethylenically unsaturated monomers that are selected from the group consisting of ethylene, butadiene, styrene, vinyl acetate, vinyl propionate, vinyl butyrate, acrylic acid, methacrylic acid, esters of acrylic acid and esters of methacrylic acid.

* * * * *